United States Patent [19]

Kelly

[11] Patent Number: 4,470,280

[45] Date of Patent: Sep. 11, 1984

[54] SWAGING APPARATUS WITH TIMED PRE-FILL

[75] Inventor: John W. Kelly, Burbank, Calif.

[73] Assignee: Haskel, Inc., Burbank, Calif.

[21] Appl. No.: 494,786

[22] Filed: May 16, 1983

[51] Int. Cl.³ .............................................. B21D 72/10
[52] U.S. Cl. .................................... 72/61; 72/453.01;
 72/453.02; 29/727; 91/400; 91/410; 91/433;
 60/540; 60/541; 60/593
[58] Field of Search ........... 72/61, 62, 453.01, 453.02;
 100/269 B; 29/727; 60/544, 541, 547, 537, 593;
 91/400, 410, 433

[56] References Cited

U.S. PATENT DOCUMENTS

| | | | |
|---|---|---|---|
| 3,585,701 | 6/1971 | Stary | 29/727 |
| 4,055,063 | 10/1977 | Krips | 72/62 |
| 4,362,037 | 12/1982 | Whitfield | 72/62 |
| 4,407,150 | 10/1983 | Kelly | 72/61 |

Primary Examiner—Leon Gilden

Attorney, Agent, or Firm—Pretty Schroeder Brueggemann & Clark

[57] ABSTRACT

In an apparatus for forming leak-proof joints between tubes and a tube sheet by the internal application of hydraulic swaging pressure, the flow of relatively low pressure fluid from a pressure source to an intensifier is permitted or interrupted by a control valve. During a prefill period, a prefill valve causes the low pressure fluid to bypass the low pressure input side of the intensifier and flow directly to the high pressure side and then to a mandrel. Thereafter, the low pressure fluid is caused to enter the low pressure side of the intensifier to increase the pressure in the mandrel during a swaging period. A pressurization sensor, which is connected to the input and output sides of the prefill valve, contains a piston which is movable in response to the difference in the pressures at these two points to produce a termination signal which, after a delay, actuates the control signal at the end of the swaging period.

12 Claims, 1 Drawing Figure

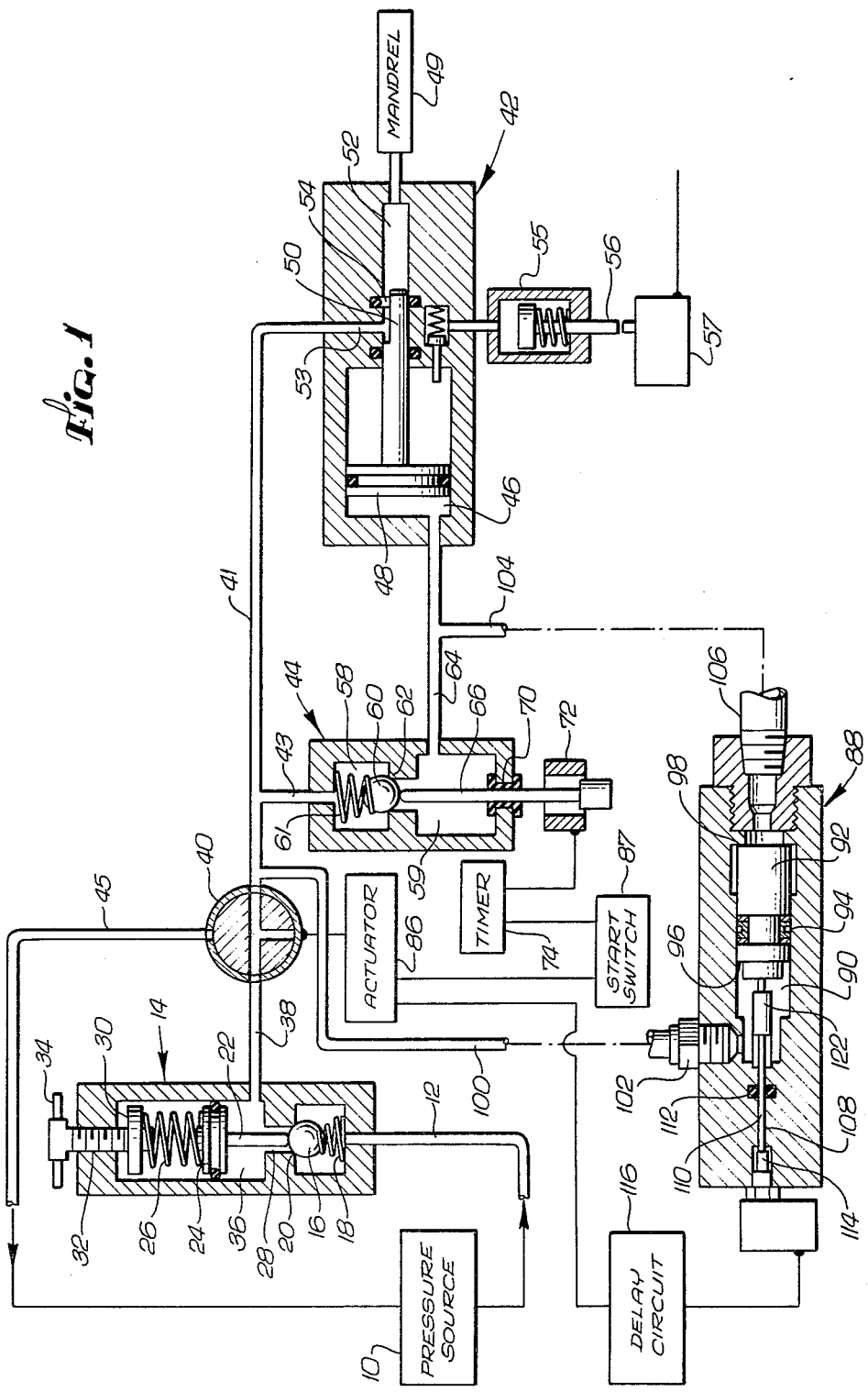

SWAGING APPARATUS WITH TIMED PRE-FILL

FIELD OF THE INVENTION

The present invention relates to hydraulic swaging in the formation of leak-proof joints between tubes and a tube sheet, and, more particularly, it relates to the automated regulation of hydraulic fluid flow.

BACKGROUND OF THE INVENTION

In the construction of a typical heat exchanger, a large number of tubes must pass through a tube sheet, and leak-proof joints must be formed between the tubes and the sheet. When, for example, the heat exchanger forms part of a nuclear power plant, unusually high standards of reliability are required. In such applications, the tube sheet, which is made of steel as much as two-feet thick, separates heated radio-active nuclear material from non-radio-active cooling fluid, such as water. It is apparent that even very small leaks between these heat exchanger zones are intolerable. A large number of such joints are included in a single heat exchanger, and each joint must meet the same high standards of reliability.

Although roller swaging has been used to form tube and tube sheet joints, hydraulic swaging has proven to be superior. Hydraulic swaging pressures as high as 50,000 p.s.i. can be uniformly applied throughout a selected axial portion of the tube. In pending U.S. patent application Ser. No. 271,373, entitled: APPARATUS FOR SUPPLYING AND CONTROLLING HYDRAULIC SWAGING PRESSURE, the present inventor has disclosed an apparatus for supplying and controlling hydraulic swaging pressure, and that application is hereby incorporated by reference herein. The invention disclosed in that application permits the automation, to a considerable extent, of the formation of tube/tube sheets joints, reducing the possibility of human error.

In most previously known hydraulic swaging apparatus, a mandrel is inserted in the portion of the tube within the tube sheet, and axially separated seals carried by the mandrel define a pressure zone in which the swaging pressure is to be applied. Pressurized fluid is then introduced through the mandrel into a small annular space between the mandrel and the tube to expand the tube radially. Typically the pressure is first generated by a pump and then multiplied by an intensifier before it is supplied to the mandrel.

A skilled worker must insert the mandrel in each tube individually and cause pressure to be applied by the operation of a control valve. Once the valve has been opened, sufficient time must be allowed for the pressure to reach the desired level. For best results, the pressure should be held at that level for a finite time period on the order of magnitude of two seconds. The optimum swaging pressure and dwell time varies, depending on the specific characteristics of the tube and the tube sheet.

The intensifier is capable of expelling into the mandrel only a relatively small quantity of high pressure fluid before the pistons reach the ends of their strokes. Thus, the mandrel and the interior portion of the tube with which it communicates should be prefilled at low pressure to consistently obtain optimum joints. Otherwise, the pressure generated by the intensifier may be lost in filling the mandrel and the joint will not be properly formed.

Ideally, the swaging apparatus should be automated to reduce the possibility of human error. A primary objective of the present invention is to provide a swaging apparatus for use in forming tube and tube sheet joints which is automated to ensure, with a high degree of reliability, proper prefilling before the increased pressure from the intensifier is applied to the joint. A still further objective is the provision of such an apparatus that is highly efficient and permits each of many joints to be formed consistently within a minimum time period.

SUMMARY OF THE INVENTION

An apparatus for forming leak-proof joints between tubes and tube sheets, constructed in accordance with the present invention, accomplishes the above objectives. It includes a pressure source for supplying hydraulic fluid under relatively low/level pressure and an intensifier for increasing the pressure of the fluid to a relatively high level. A mandrel that fits within the tube to be swaged delivers the fluid to the tube.

The intensifier includes a low pressure input side and a high pressure output side. A prefill means causes low pressure fluid to flow first to the mandrel during a prefill period, thereby prefilling the mandrel and the tube, and thereafter causes low pressure fluid to flow to the input side of the intensifier, commencing a swaging period. In a preferred embodiment of the invention, the low pressure fluid flows through the output side of the intensifier to the mandrel without flowing through the input side during a prefill period.

The prefill means may include a prefill valve and a prefill timer that terminates the prefill period by actuating the prefill valve. The prefill valve may include a seat and a ball urged against the seat by the low pressure fluid, the ball being forced off the seat during the swaging period.

According to another aspect of the invention, the intensifier includes blocking means for blocking the flow of low pressure fluid to the output side. It may include a prefill inlet and a piston, which may define a channel that cooperates with the inlet. The piston blocks the inlet after the swaging period begins.

According to still another aspect of the invention, a pressurization sensor is included in the apparatus. The sensor receives inputs from points that are upstream and downstream of the prefill valve and terminates the swaging period after a predetermined comparative pressure relationship between these inputs has been reached.

Other features and advantages of the present invention will become apparent from the following detailed description, taken in conjunction with the accompanying drawings, which illustrate, by way of example, the principles of the invention.

DETAILED DESCRIPTION OF THE DRAWING

The drawing is a partially diagrammatic illustration of an apparatus constructed in accordance with the present invention, the pressure reduction valve, prefill valve, intensifier, and pressurization sensor being shown in transverse cross-section.

DESCRIPTION OF THE PREFERRED EMBODIMENT

An apparatus, constructed in accordance with the present invention and shown in the drawing, includes a pressure source 10 by which a hydraulic fluid such as water is initially pressurized. Suitable pressure sources of conventional construction include a pump and a reserve tank (not shown separately in the drawing). The fluid exiting from the pressure source 10 is, however, at a relatively low pressure considerably below that required for hydraulic swaging.

From the pressure source 10, fluid is supplied by a line 12 to the input side of a pressure reduction valve 14. This valve 14 includes, at its bottom end, a ball 16 held by a ball spring 18 against a seat 20 to keep the valve closed. A counter-force is applied from above by a rod 22 that projects downwardly from a piston 24, the piston being urged downwardly by a coil spring 26 so that the force of the piston 24 tends to unseat the ball 16 and allow fluid to flow past the seat 20 through an orifice 28. The top of the coil spring 26 presses against a retainer 30 which is adjustably positioned at the top by a threaded member 32 that is integrally formed with an external handle 34. Thus, by turning the handle 34 the retainer 30 is lowered. In this way, upward force on the piston 24 required to raise the piston to the extent that the ball 16 closes against the seat 20 is increased.

Although the adjustable pressure reduction valve 14 is shown in its closed position with the ball 16 against the seat 20, the force of the coil spring 26 will overcome the ball spring 18 and push the ball 16 off the seat 20 when the apparatus is depressurized. However, the passage of pressurized fluid into a chamber 36 above the seat 20 and below the piston 24 tends to overcome the force of the coil spring 26, allowing the ball 16 to rise closer to the seat. The effect of the counteracting forces of the pressure in the chamber 36 and the coil spring 26 is to retain the ball 16 in a relatively quiescent position in which the output pressure of the valve 14 is reduced to a level corresponding to the position to which the retainer 30 is adjusted.

Low pressure hydraulic fluid exists from the chamber 36 by a line 38 leading to a control valve 40. With the control valve 40 in its open or flow-through position, as shown in the drawing, the pressurized fluid can flow through a line 41 to an intensifier 42 and through a branch line 43 to a prefill valve 44. In a second position, the control valve 40 permits return flow to the pressure source 10 through a line 45.

The function of the intensifier 42 is to elevate the pressure of the hydraulic fluid to that required for swaging. It has an input side with a low pressure cylinder 46 in which a relatively large first piston 48 can reciprocate. A high pressure output side connected to a mandrel 49 includes an axially aligned rod-like smaller second piston 50, the two pistons moving together. The opposite end of the smaller piston rides in a high pressure cylinder 52.

A prefill inlet 53 in the high pressure cylinder 52 can receive low pressure fluid from the line 41 when the smaller piston 50 is withdrawn from the high pressure cylinder to the maximum extent (as shown in the drawing). A channel 54 extending axially along the surface of the smaller piston 50 permits this inflow of low pressure fluid. As the piston 50 moves into the cylinder, however, it serves to block the prefill inlet 53. An air valve 55 is arranged to be actuated by the large piston 48 in the event that a lack of swaging resistance causes the larger piston to travel the full length of the low pressure cylinder 46. In that event, the air valve 55 causes an external piston 56 to operate a no-swage switch 57, the significance of which will be explained below.

The prefill valve 44 includes two chambers 58 and 59. The first chamber 58 is connected to the branch line 43 which supplies low pressure fluid when the control valve 40 is open. It contains a ball 60 urged by a ball spring 61 against a seat 62 to keep the valve 44 closed. The second chamber 59 is connected by a line 64 to the low pressure cylinder 46 of the intensifier 42, and a rod 66 aligned with the ball 60. A seal 70 encircles the rod 66 to prevent leakage of the swaging fluid when the prefill valve 44 is open. A solenoid 72 responsive to a prefill timer 74 causes the rod 66 to lift the ball 60.

Although each cycle of operation of the apparatus is commenced by a manually initiated signal from a start switch 87, it is terminated automatically by a signal to a control valve actuator 86. This actuator 86 is, in turn, indirectly responsive to an electrical signal originated by a pressurization sensor 88. A cylinder 90 within the sensor 88 contains a piston 92 which can reciprocate slidably under the influence of the fluid pressure acting on it. The piston 92 is surrounded by a pressure seal 94. Since the cylinder 90 is longer than the piston 92, the piston can define a first chamber at one end 96 thereof and a second chamber 98 on the opposite side. The sizes of these chambers 96 and 98 depend upon the axial position of the piston 92. (In the drawing, the piston 92 has moved all the way to one side of the chamber 90, defining the largest possible chamber at the end 96 of the piston).

To influence the position of the piston 92, a first pressure line 100 is connected to the line 41 that connects the control valve 40 to the prefill valve 44. The pressure line 100 supplies this pressure from an upstream of the prefill valve 44 to an inlet portion 102 that communicates with the chamber 96 at the first end. A second pressure line 104 is connected to the line 64 by which pressurized fluid flows from a point downstream of the prefill valve 44 to the intensifier 42. This pressure line 104 is connected through an axial inlet port 106 at the opposite end of the pressurization sensor 88 so that it communicates with the chamber at the second end 98.

Extending from the first chamber 96 and away from the piston 92 is a slideway 108 in the form of a radially-centered axial bore that contains a rod 110 attached to the piston for movement therewith. A seal 112 encircles the rod 110 within the slideway 108. At the end of the slideway 108, where it can be operated by the rod 110, is an electrical switch 114. When closed, the switch 114 delivers an electrical signal to an adjustable time delay circuit 116 from which the signal is supplied to the control valve actuator 86, thereby causing the termination of the swaging cycle.

The operation of the apparatus will now be explained. When the apparatus is not in use, the control valve 40 occupies a position that is ninety degrees counter-clockwise from that shown in the drawing. In this position, fluid is prevented from flowing from the pressure reduction valve 14 to the intensifier 42 and the prefill valve 44. The line 41 by which fluid can be supplied to the intensifier 42 and the prefill valve 44 is connected to the return line 45 that permits the intensifier to be depressurized. However, pressurized fluid from the pressure reduction valve 14 does flow through the line 38 up to the control valve 40.

The user of the apparatus manually operates the start switch 87, signaling the control valve actuator 86, to cause the control valve 40 to move to the position shown in the drawing and allowing the pressure reduction valve 14 to communicate with the prefill valve 44 and the high pressure cylinder 52 of the intensifier 42 through the lines 43 and 41 respectively. This commences the prefill period of the cycle. During this period, fluid flows into the line 100 leading to the chamber at the first end 96 of the piston 92. Accordingly, that chamber 96 is pressurized, whereas no pressure is applied to the opposite end 98 of the piston 92. The piston 92, therefore, moves as far as permitted to one end of the cylinder 90 (as shown in the drawing).

The fluid entering the line 41 fills the high pressure cylinder 52, the mandrel 49 and the volume of the tube (not shown) with which it communicates. After a predetermined period, the prefill timer 74 sends a signal which activates the prefill valve solenoid 72 and causes the prefill valve 44 to open by moving the rod to unseat the ball 60. The period of delay measured by the timer 74 should be determined empirically for a particular swaging apparatus and its intended use.

Once prefilling is complete, fluid enters the second chamber 59 of the prefill valve 44 and passes through the line 64 into the first cylinder 46 of the intensifier 42. The larger piston 48, being exposed to the same pressure, easily overcomes the resistance of the smaller rod-like piston 50 and the two pistons 48 and 50 begin to move together so as to expand the first cylinder 46.

Once the cut-away portion 51 of the rod-like piston 50 passes the inlet 53, the high pressure cylinder 52 no longer communicates with the line 41 from the pressure control valve 40, thus beginning the swaging period of the cycle. Thereafter, movement of the two pistons 48 and 50 multiplies the low pressure applied to the first piston 48 and the resulting high pressure is supplied to the mandrel 49.

As the larger piston 48 moves within the first cylinder 46 of the intensifier 42, pressurized fluid from the line 64 also flows through the line 104 and into the chamber at the second end 98 of the piston 92 in the pressurization sensor 88. Initially, the pressure at the second end 98 of the piston 92 is less than the pressure at the first end 96 and the piston does not move. However, the pressure at the second end 98 continues to rise as the prefill valve 44 remains open.

The effective pressure surface of the first piston end 96 is reduced due to the presence of the rod 110 which prevents the fluid from acting on the entire surface of this piston 92. The force applied to the second piston end 98 will therefore eventually become greater than the force applied to the first end 96. The reduction in the effective pressure surface area of the first end 96 is comparatively rather small. In the preferred embodiment, the effective pressure surface areas of the first end 96 is 95 percent of the surface area of the second end 98, although this proportion may be varied in accordance with the perimeters of a particular system.

The exact configuration of the rod 110 of the pressurization sensor 88 is not critical. In this embodiment, the rod 110 has an enlarged portion 122 within the cylinder 90. However, it is the area of the rod 110 as it passes through the seal 112 that represents the actual reduction of the effective piston surface area. Any changes in the cross-section of the rod 110 between the seal 112 and the piston 92 have no significant hydraulic effect.

When the pressure in the second piston end 98 reaches 95 percent of the pressure reduction valve output pressure as applied to the first end 96, the piston 92 will move. As it moves, the rod 110 will operate the switch 114 to provide a control signal to the delay circuit 116. Once the delay to which the circuit 116 has been adjusted has expired, the control signal will be supplied to operate the control valve actuator 86, returning the control valve 40 to the position which allows communication with the return line 45, thereby causing the intensifier 42 and the mandrel 78 to be depressurized. The control valve actuator 86, when triggered by the control signal from the delay circuit 116, simultaneously sends a signal to reset the prefill timer 74. The reset signal causes the prefill valve solenoid 72 to lower the piston 66 and allow the rod 68 to return the ball 58 to its seat 62, thus closing the prefill valve 44 in preparation for the next swaging cycle.

It should be noted that pressurization sensor 88 is operated before the intensifier 42 and the mandrel 78 reach the full output pressure of the pressure reduction valve 14, in this case at 95 percent of that pressure. However, the pressure is rising rapidly at that point and the delay relay 116 can be adjusted, based on empirical results, to a level that allows full pressure to be reached before the control valve actuator 86 is operated. The delay should, however, be longer than that required merely to reach this maximum pressure. The delay should allow the system to dwell briefly at that maximum pressure for a time period sufficient to achieve the desired optimum joint between the tube and the tube sheet.

The desired swaging pressure can be set by repositioning the retainer 30. Although the pressure directly adjusted in this way is the output pressure of the pressure reduction valve 14, the output pressure of the intensifier 42 is always proportionate. It is not necessary to make adjustments to the pressurization sensor 88, because it is responsive to the comparative pressures on the input sides of the control valve 40 and intensifier 42. Thus, the switch 114 will always be operated when the intensifier 42 input pressure applied to the second chamber 98 reaches a fixed percentage of the pressure in the first chamber 96. This proportionate relationship will hold true for all pressures to which the system might be set.

The operation of the no-swage air valve 55 should also be noted. It becomes operational in the event that the tube is not effectively swaged within the tube sheet due to, for instance, a leak downstream of the intensifier 42. Such a leak could occur if, for example, the mandrel 49 were not properly sealed to the surrounding tube surface, in which case pressure would be lost. The absence of pressure resisting movement of the pistons 48 and 50 would quickly cause those pistons to move until the larger piston 48 reached the end of the first cylinder 46, operating the air valve 55 to activate a no-swage indicator (not shown). The operator would be aware of the fact that a proper joint had not been formed.

While a particular form of the invention has been illustrated and described, it will be apparent that various modifications can be made without departing from the spirit and scope of the invention. Accordingly, it is not intended that the invention be limited, except as by the appended claims.

I claim:

1. An apparatus for forming leak-proof joints between tubes and tube sheets by the application of hydraulic swaging pressure comprising:
   pressure source means for supplying a hydraulic fluid under relatively low pressure;
   mandrel means including associated conduits for delivering said pressurized hydraulic fluid to said tubes internally;

intensifier means for increasing the pressure of said fluid, said intensifier means having a low pressure input side and a high pressure output side connected to said mandrel means; and prefill means for causing said low pressure fluid to flow first to said mandrel during a prefill period, thereby prefilling said mandrel and said tube, and thereafter causing said low pressure fluid to flow to said input side of said intensifier to commence a swaging period, said prefill means including timer means for measuring a predetermined prefill period.

2. The apparatus of claim 1 wherein said prefill means further includes a valve.

3. An apparatus for forming leak-proof joints between tubes and tube sheets by the application of hydraulic swaging pressure comprising:

pressure source means for supplying a hydraulic fluid under low pressure;

intensifier means for increasing the pressure of said fluid to a relatively high pressure suitable for swaging said intensifier means having a low pressure input side and a high pressure input side, said output being connected to said pressure source means to receive said low pressure fluid directly therefrom;

mandrel means adapted to be inserted in said tubes for delivering said fluid to said tubes internally at said high pressure; and prefill valve means through which said pressure source means is connected to said input side of said intensifier means, said prefill valve means having a first condition in the flow of low pressure fluid to said input side is blocked during a prefill period to permit side mandrel to be prefilled at low pressure through said output side, and a second condition in which the flow of said low pressure fluid to said input side is permitted during a swaging period, thereby causing said intensifier means to provide high pressure fluid to said mandrel at high pressure after said mandrel and tube have been prefilled at said low pressure.

4. The apparatus of claim 3 further comprising prefill timer means for causing said prefill valve means to terminate said prefill period.

5. The apparatus of claim 3 wherein said intensifier means include blocking means for blocking the flow of said low pressure fluid to said output side after said swaging period has begun.

6. The apparatus of claim 3 wherein:

said intensifier includes a large piston and cylinder in said input side and a small piston and cylinder in said output side, said pistons being interconnected for cooperative movement;

said small cylinder including a prefill inlet for said low pressure fluid that is positioned to be blocked by movement of said small piston during said swaging period.

7. The apparatus of claim 6 wherein said small piston defines a channel through which said low pressure fluid can flow from said prefill inlet during said prefill period.

8. The apparatus of claim 3 wherein said prefill valve means includes a seat, a ball urged against said seat by said fluid, and electrically operated means for moving said ball off said seat during said swaging period.

9. The apparatus of claim 3 wherein:

said intensifier includes a large piston and cylinder in said input side and a small piston and cylinder in said output side, said pistons being interconnected for cooperative movement;

said small cylinder including a prefill inlet for said low pressure fluid that is positioned to be blocked by movement of said small piston during said swaging period; and said prefill valve means includes a seat, a ball urged against said seat by said fluid, and electrically operated means for moving said ball off said seat during said swaging period.

10. The apparatus of claim 9 wherein said small piston defines a channel through which said low pressure fluid can flow from said prefill inlet during said prefill period.

11. The apparatus of claim 10 further comprising prefill timer means for causing said prefill valve means to terminate said prefill period.

12. The apparatus of claim 10 wherein said intensifier means include blocking means for blocking the flow of said low pressure fluid to said output side after said swaging period has begun.

* * * * *